Sept. 22, 1942.   C. W. COCHRAN   2,296,768
ROTARY ENGINE
Filed March 20, 1941   3 Sheets-Sheet 1

INVENTOR
Charles W. Cochran
BY
Thos. E. Aspfield
ATTORNEY

Sept. 22, 1942.    C. W. COCHRAN    2,296,768
ROTARY ENGINE
Filed March 20, 1941    3 Sheets-Sheet 2

INVENTOR
Charles W. Cochran
BY
Thos E. Scofield
ATTORNEY

Sept. 22, 1942.   C. W. COCHRAN   2,296,768
ROTARY ENGINE
Filed March 20, 1941   3 Sheets-Sheet 3

INVENTOR
Charles W Cochran
BY
Thos. E. Scofield
ATTORNEY

Patented Sept. 22, 1942

2,296,768

UNITED STATES PATENT OFFICE 2,296,768

ROTARY ENGINE

Charles W. Cochran, Ponca City, Okla., assignor to Continental Oil Company, Ponca City, Okla., a corporation of Delaware Application March 20, 1941, Serial No. 384,314

10 Claims. (Cl. 123—8)

My invention relates to rotary engines and more particularly to a rotary internal combustion engine.

Many attempts have been made to produce rotary engines to eliminate the disadvantages of converting reciprocating motion to rotary motion by means of a crank shaft or the like. These attempts have been commercially unsuccessful, due to difficulties in sealing.

One object of my invention is to provide a rotary engine in which any leakage occurring will be returned to the next stroke, eliminating the most serious disadvantage of rotary engines heretofore known to the art.

Another object of my invention is to provide a simple, rugged and efficient rotary engine in which valves, springs, cams and reciprocating parts are eliminated.

Another object of my invention is to provide a rotary engine having a large number of impulses per revolution to obtain smoother operation and enable use of a smaller fly wheel.

Another object of my invention is to provide a rotary engine having few moving parts so constructed that they may be easily machined and manufactured.

Other and further objects of my invention will appear from the following description.

In the accompanying drawings which form part of the instant specification and are to be read in conjunction therewith and in which like reference numerals are used to indicate like parts in the various views.

For purposes of convenience and by way of illustration, but not by way of limitation, my engine will be described for the Otto cycle, though it is to be understood that it may be used with the Diesel cycle, mixed cycle and the like. It will be further understood that, while I have described my engine as a prime mover, it can be used as a pump, compressor or the like by driving the rotor.

Figure 4:
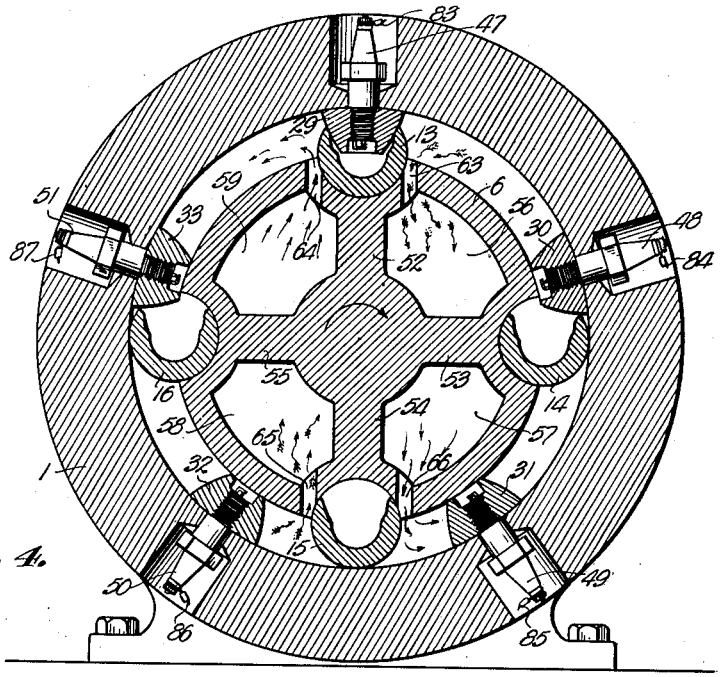
Figure 4 is a sectional view taken on the line 4—4 of Figure 1.

Referring now to the drawings, the engine comprises a stationary housing 1, which is in the form of a section of a hollow cylinder, as can readily be seen by reference to Figure 4. The ends of the cylinder are closed by head sections 2 and 3. Head section 2 is secured to the body cylinder 1 by means of stud bolts 4, or in any other suitable manner. Head section 3 is secured to the body cylinder 1 by means of stud bolts 5 or in any other suitable manner, as for example by flanges or the like. A rotor 6 is formed with shafts 7 and 8 and is rotatably positioned in bearings 9 and 10, carried in head sections 2 and 3 respectively. Head section 3 acts as the intake manifold to which a combustible mixture is fed through pipe 11. An annular gear 12 is housed within the head section 3. The rotor 6 carries a plurality of rotary abutments 13, 14, 15, and 16, as can readily be seen by reference to Figure 4. Each of the rotary abutments is formed with reduced end portions 17, 18, 19, and 20, respectively, projecting into each of the heads 2 and 3. The ends 17, 18, 19, and 20 projecting into head 3 carry pinions 21, 22, 23, and 24 respectively, secured thereto by suitable keys 25, 26, 27, and 28 respectively. The pinions 21, 22, 23, and 24 engage the annular ring gear 12, as can readily be seen by reference to Figure 5. The pinions meshing with the stationary ring gear 12 serve to keep the rotary abutments in timed relation to the stator and to the stationary abutments. These stationary abutments 29, 30, 31, 32, and 33 are secured to the stator 1 by stud bolts 34, and project into the interior of the stator as can readily be seen by reference to Figures 1 and 4.

Head section 2 acts as an exhaust manifold and is provided with a port 35 from which the exhaust gases pass to the muffler or to the atmosphere. The ends 17, 18, 19, and 20 of the rotary abutments 13, 14, 15 and 16 which project into the head 2 are balanced with respective counterweights 36, thereby giving the rotary abutments static, as well as kinetic balance.

At this juncture, it will be well to point out that my showing is diagrammatic only and I have shown no cooling system. It will be understood, by those skilled in the art that my engine may be either liquid-cooled or air-cooled by any of the modes well known to the art. In the interests of simplicity, therefore, I have omitted a showing of a cooling system.

A pressure plate bearing member 37 within the head 2 is secured to the rotor by means of stud bolts 38. A pressure plate bearing member 39 within the head 3 is secured to the rotor 6 by means of stud bolts 40. The ends of the rotary abutments rotate in bearings 41 in the bearing member 39 and in bearings 42 in the bearing member 37. Sealing rings 43 seal off the rotary bearing member 39 from the stator 1. Sealing rings 44 seal off the rotating bearing member 37 from the stator 1. Each of the rotary abutments is provided with sealing rings 45 and 46, at opposite ends, for sealing the combustion chambers from the bearings 42 and 41 respectively. Spark plugs or other ignition means 47, 48, 49, 50, and 51 extend through stationary abutments 29, 30, 31, 32, and 33 respectively, as can readily be seen by reference to Figure 4.

It will be noted that the stationary abutments 29, 30, 31, 32, and 33 are one more in number than the rotary abutments 13, 14, 15, and 16. This causes each rotary abutment to have a different relative position in relation to the stationary abutments thus forming no dead centers. The curved sides of the stationary abutments are so constructed that the edges of the rotary abutments, in rotating past them, will constantly contact the sides. The sides of the stationary abutments are developed by plotting the path of a point on the edge of the rotary abutments as the rotor revolves in the stationary housing 1. The arrangement is such that there is no slippage between the stationary cylindrical housing 1 and the rotary abutments. The ratio between the number of teeth in the ring gear and the number of teeth in the actuating pinions of respective rotary abutments is such in the form shown that a rotary abutment will make one complete revolution every ninety degrees of movement of the rotor. In other words, the rotary abutments turn four times as fast as the rotor.

Figure 5:
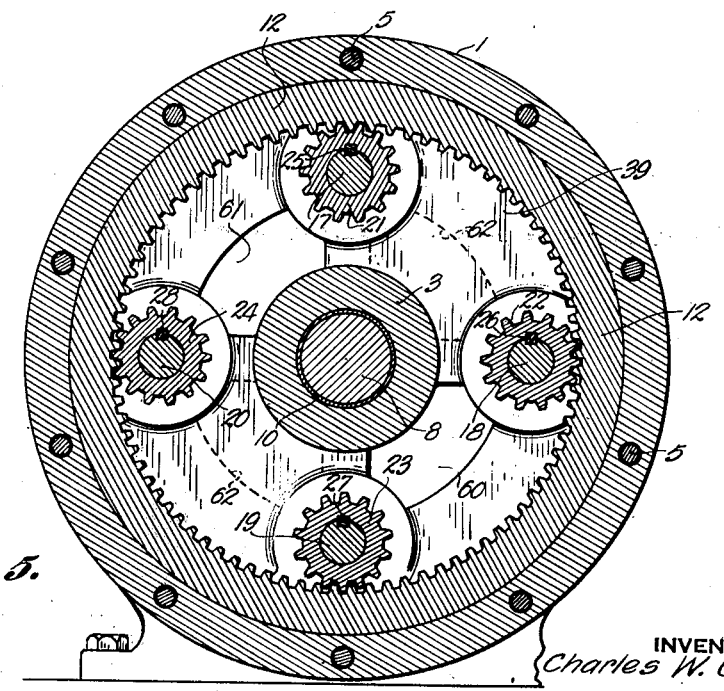
Figure 5 is a sectional view taken on the line 5—5 of Figure 1.

Referring now to Figure 4, it will be seen that the rotor 6 is hollow and divided by radially extending partitions 52, 53, 54, and 55, into four chambers 56, 57, 58 and 59. Chambers 57 and 59 are intake chambers. Referring now to Figure 5, it will be noted that the pressure plate bearing member 39 is formed with ports 60 and 61. Port 61 provides communication between the intake manifold and intake chamber 59. Port 60 provides communication between the intake manifold in head 3 and intake chamber 57. Chambers 56 and 58 are exhaust chambers and communicate through suitable ports 62 with the exhaust manifold in head 2. A port 63 communicates with exhaust chamber 56. A port 64 communicates with intake chamber 59. A port 65 communicates with exhaust chamber 58, and a port 66 communicates with intake chamber 57. The volumes bounded by the stator, pressure plate bearing members 37 and 39, the rotor 6, and adjacent stationary abutments form cylinders in which the rotary abutments act as pistons.

It might be well to call attention to the fact that, in keeping with my desire to simplify the explanation of my invention, I have not shown the details of an oiling system. Any suitable method of lubricating my engine may be employed. Lubricating oil, for example, may be mixed with a fuel and any suitable lubricating system known to the art, such as forced feed lubrication systems, may be employed.

Referring now to Figure 4, rotary abutments 13 and 15 are not instrumental in directly producing any power. They are merely scavenging elements that continually force the exhaust gases out of the chambers or cylinders ahead of them, through ports 63 and 65, which it will be noted are positioned directly in front, that is, lead the rotary abutments 13 and 15. At the same time, the rotary abutments 13 and 15 act to constantly draw in fresh charge behind them through ports 64 and 66, which, it will be seen, are positioned directly behind the rotary abutments 13 and 15 and communicate with the intake chambers 59 and 57.

It will be clear to those skilled in the art that, in my construction the two low pressure components of the cycle, namely the exhaust and the intake components, are on the opposite sides of the scavenging elements, that is, the rotary abutments 13 and 15. The exhaust pressure is generally a few pounds positive pressure, while the intake pressure is usually a few pounds negative pressure. It will be readily apparent, therefore, that, in my construction, any tendency for leakage past the rotary abutments will be from the exhaust side to the intake side. This slight leakage of exhaust gases, if it does occur, simply raises the temperature of the intake gases increasing their energy content and making further use in particular of available heat energy.

The rotary abutments 14 and 16 are the power elements. These power elements continually compress the fresh charge ahead of them and continually act to transmit power from the burning compressed charges behind them. It will be readily apparent that, in my construction, any tendency to leakage is reduced since the high pressure components of the cycle, namely compression and firing or impulses, are on opposite sides of rotary abutments 14 and 16. It will be further apparent that the firing or power component of the cycle is and must be of higher pressure than the compression component of the cycle. Accordingly, leakage will be from the burning charge to the charge being compressed. Any gas which leaks from the firing cylinder to the compression side will be picked up in the next chamber, increasing the temperature of the compressed charge, thus making use of the available heat energy.

It will be further clear in my construction that any leakage past the stationary abutments 29, 30, 31, 32, and 33 will be from the compression side to the intake side, so that the leakage of unburned gases will be employed in the next chamber, avoiding any waste of fuel. My arrangement, therefore, simplifies the problem of packing.

Figure 1:
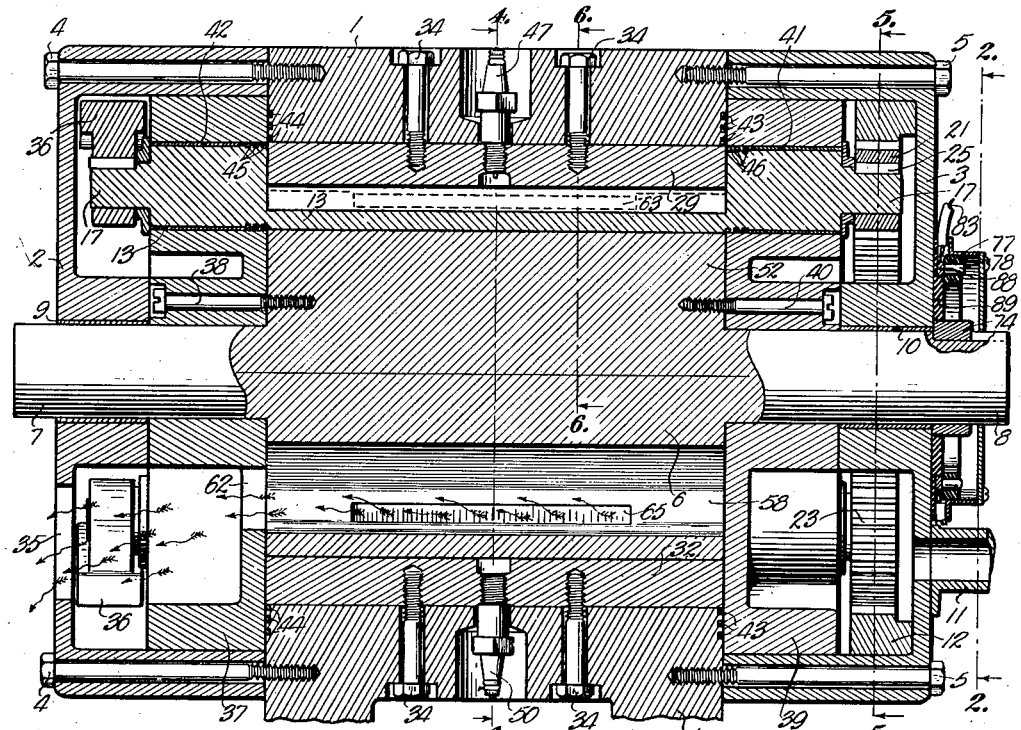
Figure 1 is a sectional view of a rotary engine, showing one embodiment of my invention, taken on the line 1—1 of Figure 2.
Figure 2:
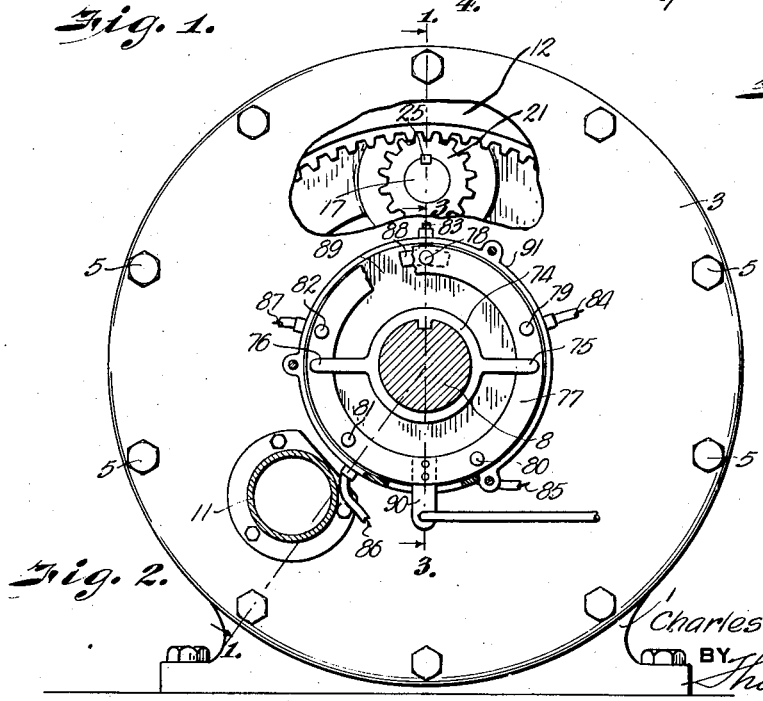
Figure 2 is a sectional view, taken on the line 2—2 of Figure 1, with part of the end plate broken away.
Figure 3:
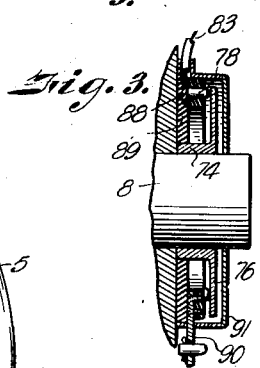
Figure 3 is a fragmentary sectional view of a detail taken on the line 3—3 of Figure 2.
Figure 6:
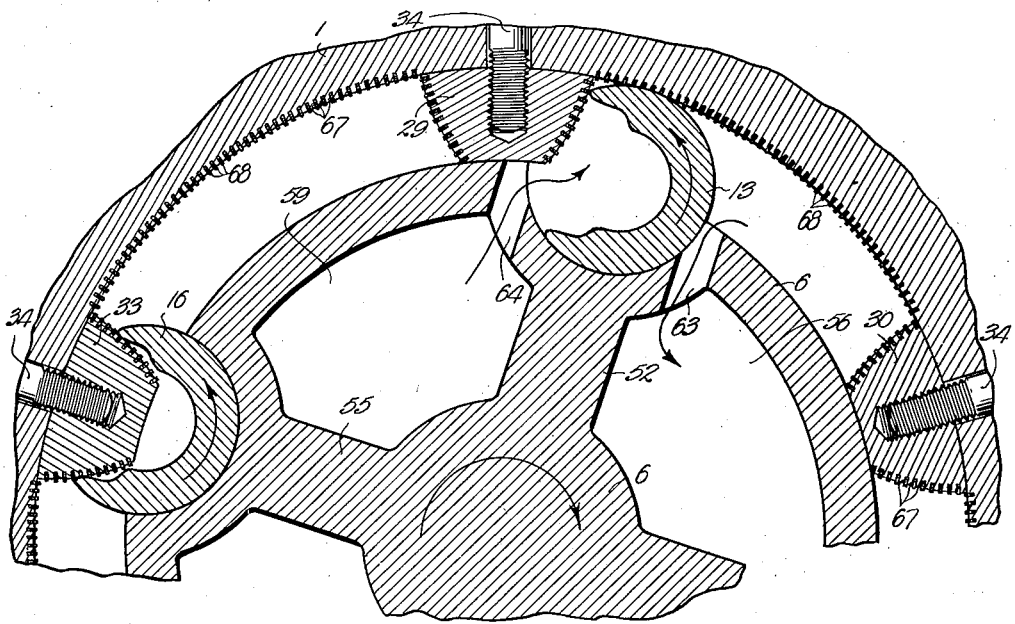
Figure 6 is a sectional view taken on the line 6—6 of Figure 1.
Figure 7:
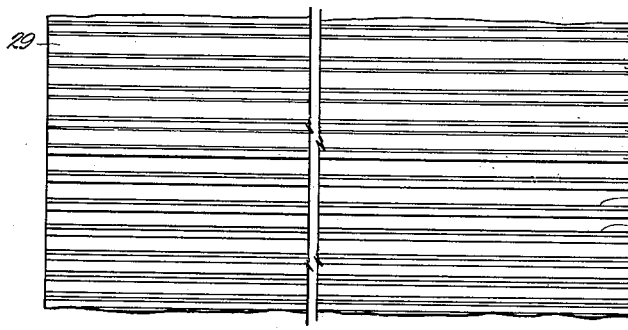
Figure 7 is an elevation of a portion of a stationary abutment showing sealing means employed.
Figure 8:
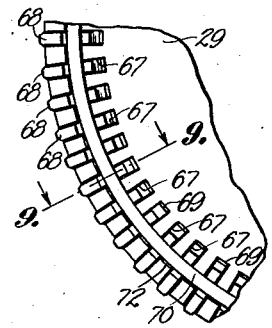
Figure 8 is a fragmentary end view of a portion of a stationary abutment showing sealing means.
Figure 9:
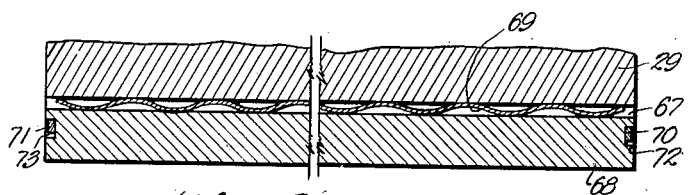
Figure 9 is a sectional view taken on the line 9—9 of Figure 8.

Figure 6 is a sectional view on an enlarged scale, taken on the line 6—6 of Figure 1, and shows one method of packing my engine. A plurality of slots 67 are formed in the stationary abutments 29, 30, 31, 32, and 33, and in the interabutment area of the stator 1. These slots run in a direction parallel to the axis of the rotor 6 and extend between pressure plates 37 and 39. Seated within each slot 67 is an elongated sealing member 68. The members 68 of course may be formed of a plurality of sections, if desired, or may be single strips. Spring means 69 laid in the bottom of each slot 67 urge the sealing members 68 outwardly. Rings 70 and 71 seat in reentrant portions 72 and 73, formed at respective ends of the sealing strips 68. The sealing means minimize the leakage of gases between various components of the Otto cycle. Each of the spark plugs fires as one of the power rotating abutments 14 or 16 passes over it. The distributor for firing the spark plugs is shown at the right hand side of Figure 1 and in Figures 2 and 3. It comprises a conducting member 74, secured to the shaft 8. A pair of arms 75 and 76 are integral with the member 74. A ring of insulating material 77 carries contact points 78, 79, 80, 81 and 82, adapted to be connected by conductors 83, 84, 85, 86 and 87, to spark plugs 47, 48, 49, 50, and 51 respectively. The contact pins 78, 79, 80, 81, and 82 contact segments 88 formed on a disk 89, made of insulating material. These segments are connected to the conductors. Secured to the ring 77 is an arm 90 by which the ring 77 may be rotated to advance or retard the point of ignition. The distributor is provided with a cover member 91. It will be observed that there are no reducing distributor timing gears since the distributor runs at the same speed as the engine and since each rotating power element 14 and 15 fires every time it passes a stationary abutment.

It is believed that the operation of the engine will be understood from the foregoing description. With the parts in the position shown in the drawings, the charge confined by power element 14 has just fired by contact arm 75 passing over contact point 79. The burning gases are expanding in the cylinder formed by the internal wall of the stator 1, the exterior surface of rotor 6, stationary abutment 30 and the rotary abutment 14. Gases ahead of stationary abutment 14 are being compressed. A fresh charge is being drawn from chamber 57 through port 66 behind rotary abutment 15. Burnt gases ahead of rotary abutment 15 are being forced out through port 65 into an exhaust chamber 58. It will be observed that the gases previously fired in power rotary abutment 16 by spark plug 50 are still burning behind this rotary abutment. Fresh charge ahead of rotary abutment 16 is being compressed so that it will be in a position to fire when contact arm 76 makes contact with contact point 82. The forward movement of rotary abutment 13 moving away from stationary abutment 33 causes fresh charge to be drawn from intake chamber 59 through port 64. Gases ahead of rotary abutment 13 will be scavenged by its rotation out through port 63 into exhaust chamber 56. Starting with the position shown in Figure 4, the firing order will be as follows: the charge in rotary abutment 14 has just been fired by spark plug 48. The compressed charge in rotary abutment 16 will next be fired at spark plug 51. The compressed charge in power rotary abutment 14 will then be fired by spark plug 49. Then the compressed charge at rotary power abutment 16 will be fired by spark plug 47. Then the compressed charge in rotary abutment 14 will be fired by spark plug 50, after which the compressed charge at rotary abutment 16 will be fired by spark plug 48. Then the compressed charge at rotary abutment 14 will be fired by spark plug 51, the compressed charge at rotary abutment 16 will be fired by spark plug 49. Then the compressed charge at rotary abutment 14 will be fired by spark plug 47. Then the compressed charge at rotary abutment 16 will be fired at spark plug 50, returning to the firing of the compressed charge in rotary abutment 14 by spark plug 48.

It will be seen that there are ten firing impulses for one complete revolution or the equivalent in an Otto cycle engine of twenty cylinders. It will be obvious to those skilled in the art that this will result in a much smoother engine which is easier to start and which will require a smaller fly wheel. Since there are ten firing impulses in one complete revolution, the rotor cannot be turned more than 36 degrees without obtaining a firing impulse, making for ease in starting.

Since the firing chamber on my engine is a flat circular chamber, it has more surface per cubic inch of displacement than a cylindrical chamber. This makes for ease in cooling and for more even expansion as the parts of the engine heat up.

It will be further observed that, since there is a continuous flow of gases through the intake and exhaust ports, these ports may be made smaller than those now in use. Furthermore, no valves are required, eliminating the necessity of grinding valves, valve springs and wire drawing of the gases as the valves lift and seat.

It will be seen that I have accomplished the objects of my invention. I have provided a rotary engine of simple and rugged construction in which the disadvantages of the prior art are eliminated. The arrangement of parts minimizes leakage and any leakage tends to increase the available heat energy. I have eliminated all valves, springs, cams, distributor gears and reciprocating parts, thus avoiding the main source of engine trouble. A large number of impulses per revolution result in smoother operation and reduce the necessity of a large fly wheel. My engine is composed of few parts, which are easy to machine and manufacture. Due to the increased number of impulses per revolution, my motor is easier to start than the conventional engines of the prior art.

The utilization of parts greatly reduces the weight of the engine per horsepower, making my engine particularly adapted to aircraft use. The shape of the firing chambers makes for ease in cooling and provides for more even expansion and contraction of parts. The compression ratio may be easily changed by changing the thickness of the walls of the rotary power abutments. The rotary element is symmetrical with the result that the parts may be easily balanced. Due to the minimized vibration, my engine may be mounted on a lighter framework than heretofore possible for an engine of equivalent power. Due to the fact that my sealing means is stationary, it can be made of any desired weight and sturdiness, enabling the engine to run for longer periods of time without the necessity of replacing sealing "rings."

It will be observed further, that the rotary abutments 13, 14, 15, and 16 are elongated hollow cylinders having portions thereof cut away in a direction extending axially thereof. The cylinders rotate in grooves formed in the rotor 6. The grooves have a surface along segments of cylinders. The groove segment is of greater arc than the cutaway portion of the rotary abutments, so as the rotary abutments rotate, no direct communication is ever afforded from the space ahead to the space behind the rotary abutments. The rotary abutments may be characterized as pistons which travel around with the rotor and, at the same time, rotate in a direction opposite to the direction of rotation of the rotor.

It will be understood that certain features and subcombinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described, except as required by the claims herewith.

Having thus described my invention, I claim:

1. A rotary engine including in combination a cylindrical casing forming a stator, a rotor mounted concentrically within said casing having its external periphery spaced from the internal periphery of said casing, said rotor being formed with a plurality of cylindrical troughs, a plurality of rotary pistons mounted in respective troughs for rotation therein in timed relation with said rotor, said rotary pistons having the form of hollow cylinders with a portion of their sides removed, said removed portions subtending a smaller angle than the angle subtended by respective cylindrical surfaces of said troughs, a plurality of stationary abutments dividing the annular space between the rotor and stator into a plurality of motor chambers and having sides curved along the locus of travel of the edges of the rotary pistons, plates secured to the sides of said rotor and closing the annular space between said rotor and said stator, heads secured to said stator forming chambers at each end thereof, said rotor being formed with an intake chamber and an exhaust chamber, means for introducing fuel to one of said heads, means in one of said plates providing communication between said head and said intake chamber, means providing communication between the exhaust chamber through the other of said plates to the other of said heads and means for conducting exhaust gases from said last named head.

2. A rotary engine including in combination a cylindrical casing forming a stator, a rotor mounted concentrically within said casing having its external periphery spaced from the internal periphery of said casing, said rotor being formed with a plurality of cylindrical troughs, a plurality of rotary pistons mounted in respective troughs for rotation therein in timed relation with said rotor, said rotary pistons having the form of hollow cylinders with a portion of their sides removed, said removed portions subtending a smaller angle than the angle subtended by respective cylindrical surfaces of said troughs, and a plurality of stationary abutments in the annular space between said rotor and said stator, said stationary abutments dividing the annular space between the rotor and stator into a plurality of motor chambers, there being $n$ rotary pistons of which $n/2$ are power pistons and $n/2$ are scavenger pistons, said power pistons being arranged alternately with said scavenger pistons and $n+1$ stationary abutments in which $n$ is any even integer, each of said power pistons adapted to transmit the thrust of the burning charge behind it to said rotor and compress the fresh charge ahead of it.

3. A rotary engine including in combination a cylindrical casing forming a stator, a rotor mounted concentrically within said casing having its external periphery spaced from the internal periphery of said casing, said rotor being formed with a plurality of cylindrical troughs, a plurality of rotary pistons mounted in respective troughs for rotation therein in timed relation with said rotor, said rotary pistons having the form of hollow cylinders with a portion of their sides removed, said removed portions subtending a smaller angle than the angle subtended by respective cylindrical surfaces of said troughs and a plurality of stationary abutments dividing the annular space between the rotor and stator into a plurality of motor chambers, the abutments entering the hollow pistons to form a firing chamber and having sides curved along the locus of travel of the edges of the said rotary pistons, and ignition means extending through each of said stationary abutments for igniting the charge in the firing chamber.

4. A rotary engine including in combination a cylindrical casing forming a stator, a rotor mounted concentrically within said casing having its external periphery spaced from the internal periphery of said casing, said rotor being formed with a plurality of cylindrical troughs, a plurality of rotary pistons mounted in respective troughs for rotation therein in timed relation with said rotor, said rotary pistons having the form of hollow cylinders with a portion of their sides removed, said removed portions subtending a smaller angle than the angle subtended by respective cylindrical surfaces of said troughs and a plurality of stationary abutments dividing the annular space between the rotor and stator into a plurality of motor chambers, the abutments snugly fitting in the hollow pistons to provide a firing chamber, ignition means extending through each of said stationary abutments for igniting the charge in the firing chamber, and a rotary switch rotated by said rotor in phase therewith for actuating said ignition means in timed relation to ignite a fresh charge every time a power piston passes one of the stationary abutments.

5. A rotary engine including in combination a cylindrical casing forming a stator, a rotor mounted concentrically within said casing having its external periphery spaced from the internal periphery of said casing, said rotor being formed with a plurality of cylindrical troughs, a plurality of rotary pistons mounted in respective troughs for rotation therein in timed relation with said rotor, said rotary pistons having the form of hollow cylinders, a plurality of stationary abutments dividing the annular space between the rotor and stator into a plurality of motor chambers, each of said abutments being shaped to snugly fit but not fill the hollow pistons whereby to form a closed firing chamber within the piston, means for introducing fuel into the motor chambers, exhaust means for removing gases from the motor chambers, the arrangement being such that as the piston passes through a motor chamber it will compress the fuel in advance thereof and as it passes over the succeeding abutments it will collect the compressed fuel in the firing chamber, and ignition means extending through the abutments for igniting the compressed charge in the firing chamber.

6. A rotary engine including in combination a cylindrical casing forming a stator, a rotor mounted concentrically within said casing having its external periphery spaced from the internal periphery of said casing, said rotor being formed with a plurality of cylindrical troughs, a plurality of rotary pistons mounted in respective troughs for rotation therein in timed relation with said rotor, said rotary pistons having the form of hollow cylinders, a plurality of stationary abutments dividing the annular space between the rotor and stator into a plurality of motor chambers, each of said abutments being shaped to snugly fit but not fill the hollow pistons whereby to form a closed firing chamber within the piston, means for introducing fuel into the motor chambers, exhaust means for removing gases from the motor chambers, the arrangement being such that as the piston passes through a motor chamber it will compress the fuel in advance thereof and as it passes over the succeeding abutments it will collect the compressed fuel in the firing chamber, ignition means extending through the abutments for igniting the compressed charge in the firing chamber, and a rotary switch rotated by said rotor in phase therewith for actuating said ignition means every time a charge is collected in the firing chamber.

7. A rotary engine including in combination a cylindrical casing forming a stator, a rotor mounted concentrically within said casing having its external periphery spaced from the internal periphery of said casing, said rotor being formed with a plurality of cylindrical troughs, a plurality of rotary power pistons having the form of hollow cylinders mounted in respective troughs for rotation therein in timed relation with said rotor, a plurality of stationary abutments in the annular space between said rotor and said stator dividing the annular space into a plurality of motor chambers, means for introducing fuel into the motor chambers, exhaust means for removing gases from the motor chambers, said abutments being shaped to snugly fit but not fill the hollow pistons and having sides curved along the locus of travel of the edges of the rotary pistons whereby each abutment will cooperate with each piston to form a closed firing chamber from the time the piston contacts the abutment until the piston leaves the abutment, the arrangement being such that as each piston passes through a motor chamber toward an abutment it will compress a charge of fuel in advance thereof and, as the piston passes over the abutment it will collect the compressed fuel in the firing chamber and transfer the charge of fuel from a position ahead of the piston to a position behind it, and means for igniting the compressed charge in the firing chamber after the charge has been transferred to a position behind the piston.

8. A rotary engine including in combination a cylindrical casing forming a stator, a rotor mounted concentrically within said casing having its external periphery spaced from the internal periphery of said casing, said rotor being formed with a plurality of cylindrical troughs, a plurality of rotary pistons having the form of hollow cylinders mounted in respective troughs for rotation therein in timed relation with said rotor, a plurality of stationary abutments in the annular space between said rotor and said stator dividing the annular space into a plurality of motor chambers, there being $n$ rotary pistons of which $n/2$ are power pistons and $n/2$ are scavenger pistons, said power pistons being arranged alternately with said scavenger pistons, and $n+1$ stationary abutments in which $n$ is any even integer, means for introducing fuel into the motor chambers, exhaust means cooperative with the scavenger pistons for removing gases from the motor chambers, said abutments being shaped to snugly fit but not fill the hollow pistons and having sides curved along the locus of travel of the edges of the rotary pistons whereby each abutment will cooperate with each power piston to form a closed firing chamber from the time the piston contacts the abutment until the piston leaves the abutment, the arrangement being such that as each power piston passes through a motor chamber toward an abutment, it will compress a charge of fuel in advance thereof and as the piston passes over the abutment it will collect the compressed fuel in the firing chamber and transfer the charge of fuel from a position ahead of the piston to a position behind it, and means for igniting the compressed charge in the firing chamber after the charge has been transferred to a position behind the piston.

9. A rotary engine including in combination a cylindrical casing forming a stator, a rotor mounted concentrically within said casing having its external periphery spaced from the internal periphery of said casing, said rotor being formed with a plurality of cylindrical troughs, a plurality of rotary pistons having the form of hollow cylinders mounted in respective troughs for rotation therein in timed relation with said rotor, a plurality of stationary abutments in the annular space between said rotor and said stator dividing the annular space into a plurality of motor chambers, there being $n$ rotary pistons of which $n/2$ are power pistons and $n/2$ are scavenger pistons, said power pistons being arranged alternately with said scavenger pistons, and $n+1$ stationary abutments in which $n$ is any even integer, said rotor being formed with an internal exhaust chamber and an internal intake chamber, a port trailing each of said scavenger pistons providing communication between said intake chamber and the motor chambers, a port leading each of said scavenger pistons providing communication between said exhaust chamber and the motor chambers, said abutments being shaped to snugly fit but not fill the hollow pistons and having sides curved along the locus of travel of the edges of the rotary pistons whereby each abutment will cooperate with each power piston to form a closed firing chamber from the time the piston contacts the abutment until the piston leaves the abutment, the arrangement being such that as each power piston passes through a motor chamber toward an abutment it will compress a charge of fuel in advance thereof and as the piston passes over the abutment it will collect the compressed fuel in the firing chamber and transfer the charge of fuel from a position ahead of the piston to a position behind it, and means for igniting the compressed charge in the firing chamber after the charge has been transferred to a position behind the piston.

10. A rotary engine including in combination a cylindrical casing forming a stator, a rotor mounted concentrically within said casing having its external periphery spaced from the internal periphery of said casing, said rotor being formed with a plurality of cylindrical troughs, a plurality of rotary pistons having the form of hollow cylinders mounted in respective troughs for rotation therein in timed relation with said rotor, a plurality of stationary abutments in the annular space between said rotor and said stator dividing the annular space into a plurality of motor chambers, there being $n$ rotary pistons of which $n/2$ are power pistons and $n/2$ are scavenger pistons, said power pistons being arranged alternately with said scavenger pistons, and $n+1$ stationary abutments in which $n$ is any even integer, a stationary ring gear supported by said stator, a pinion on each of said rotary pistons meshing with said ring gear, the ratio of gear teeth on said pinion to the gear teeth on said ring gear being such that each of said rotary pistons will be rotated $n$ times for each rotation of said rotor, means for introducing fuel into the motor chambers, exhaust means cooperative with the scavenger pistons for removing gases from the motor chambers, said abutments being shaped to snugly fit but not fill the hollow pistons and having sides curved along the locus of travel of the edges of the rotary pistons whereby each abutment will cooperate with each power piston to form a closed firing chamber from the time the piston contacts the abutment until the piston leaves the abutment, the arrangement being such that as each power piston passes through a motor chamber toward an abutment, it will compress a charge of fuel in advance thereof and as the piston passes over the abutment it will collect the compressed fuel in the firing chamber and transfer the charge of fuel from a position ahead of the piston to a position behind it, and means for igniting the compressed charge in the firing chamber after the charge has been transferred to a position behind the piston.

CHARLES W. COCHRAN.